US012741409B2

(12) United States Patent
Suzuki et al.

(10) Patent No.: US 12,741,409 B2
(45) Date of Patent: Sep. 22, 2026

(54) METHOD FOR PRODUCING MOLDED BODY CONTAINING POLY-3-HYDROXYBUTYRATE-BASED RESIN, AND USE OF SAME

(71) Applicants: KANEKA CORPORATION, Osaka (JP); SUNTORY HOLDINGS LIMITED, Osaka (JP)

(72) Inventors: Hideyuki Suzuki, Tokyo (JP); Takashi Akiyama, Tokyo (JP); Masanori Nishiyama, Tokyo (JP); Yoshiaki Matsuoka, Takasago (JP); Nobuo Nakamura, Settsu (JP)

(73) Assignees: KANEKA CORPORATION, Osaka (JP); SUNTORY HOLDINGS LIMITED, Osaka (JP)

( * ) Notice: Subject to any disclaimer, the term of this patent is extended or adjusted under 35 U.S.C. 154(b) by 334 days.

(21) Appl. No.: 18/261,768

(22) PCT Filed: Dec. 21, 2021

(86) PCT No.: PCT/JP2021/047319

§ 371 (c)(1),
(2) Date: Jul. 17, 2023

(87) PCT Pub. No.: WO2022/158228

PCT Pub. Date: Jul. 28, 2022

(65) Prior Publication Data

US 2024/0075672 A1 Mar. 7, 2024

(30) Foreign Application Priority Data

Jan. 19, 2021 (JP) ................................ 2021-006727

(51) Int. Cl.
*B29C 49/00* (2006.01)
*B29C 49/06* (2006.01)
*B29C 49/64* (2006.01)
*B29C 49/78* (2006.01)
*C08L 67/04* (2006.01)

(52) U.S. Cl.
CPC ...... *B29C 49/0005* (2013.01); *B29C 49/6418* (2013.01); *B29C 49/786* (2013.01); *C08L 67/04* (2013.01); *B29C 49/06* (2013.01); *B29C 2049/7862* (2022.05); *B29C 2949/0811* (2022.05)

(58) Field of Classification Search
None
See application file for complete search history.

(56) References Cited

U.S. PATENT DOCUMENTS

| | | | |
|---|---|---|---|
| 6,136,260 | A | 10/2000 | Nakajima et al. |
| 6,247,836 | B1 | 6/2001 | Nakajima et al. |
| 7,422,780 | B2 | 9/2008 | Suzuki |
| 2005/0249905 | A1 | 11/2005 | Xu et al. |
| 2009/0298977 | A1 | 12/2009 | Kawahara et al. |
| 2013/0123404 | A1 | 5/2013 | Tabata et al. |
| 2020/0384745 | A1 | 12/2020 | Inagaki et al. |

FOREIGN PATENT DOCUMENTS

| | | | |
|---|---|---|---|
| CN | 104662088 | A | 5/2015 |
| JP | 9-52277 | A | 2/1997 |
| JP | 2000-6230 | A | 1/2000 |
| JP | 2004-91684 | A | 3/2004 |
| JP | 2005-89546 | A | 4/2005 |
| JP | 2020-122062 | A | 8/2020 |
| WO | WO 94/28061 | A1 | 12/1994 |
| WO | WO 2007/040243 | A1 | 4/2007 |
| WO | WO 2008/010318 | A1 | 1/2008 |
| WO | WO 2012/014670 | A1 | 2/2012 |

OTHER PUBLICATIONS

Endres, Hans-Josef Siebert-Raths, Andrea. Engineering Biopolymers—Markets, Manufacturing, Properties and Applications, Hanser Publishers, Chapter 8—Market Characterization Biopolymers, pp. 338-339. (Year: 2011).*
English machine translation of JP2005162884 and JP2005162884 in original language (Year: 2005).*
Extended European Search Report issued Oct. 2, 2024 in European Patent Application No. 21921329.5, 7 pages.
International Search Report issued Feb. 1, 2022, in PCT/JP2021/047319 (with English Translation), 4 pages.
International Preliminary Report on Patentability and Written Opinion issued Jul. 20, 2023, in PCT/JP2021/047319 (with English Translation), 9 pages.
Notice of Allowance issued to Chinese Application No. 202180090924.3 on Mar. 24, 2026, citing documents 1-3, 7 pages, (with English Translation).

* cited by examiner

*Primary Examiner* — Jennifer A Boyd
(74) *Attorney, Agent, or Firm* — Oblon, McClelland, Maier & Neustadt, L.L.P.

(57) ABSTRACT

It is an object of the present invention to provide a novel production method which makes it possible to obtain a molded product containing a P3HB-based resin through an injection blow molding method and a technique for using such a method. The object is achieved by providing a method for producing a molded product containing a P3HB-based resin, the method including the steps of: (A) plasticizing a resin composition containing a P3HB-based resin; (B) subjecting the plasticized resin composition obtained in the step (A) to injection molding to obtain a preform; and (C) subjecting the preform obtained in the step (B) to blow molding to obtain a molded product.

13 Claims, No Drawings

METHOD FOR PRODUCING MOLDED BODY CONTAINING POLY-3-HYDROXYBUTYRATE-BASED RESIN, AND USE OF SAME

CROSS-REFERENCE TO RELATED APPLICATIONS

The present application is a 35 U.S.C. § 371 national stage patent application of International patent application PCT/JP2021/047319, filed on Dec. 21, 2021, which is based on and claims the benefits of priority to Japanese Application No. 2021-006727, filed on Jan. 19, 2021. The entire contents of these applications are incorporated herein by reference.

TECHNICAL FIELD

The present invention relates to a method for producing a molded product containing a poly-3-hydroxybutyrate-based resin and use of such a method.

BACKGROUND ART

Currently, there is a need to get rid of plastic waste problems and fossil fuels, and biodegradable resins and bio-based resins have attracted attention as raw materials for containers and bottles. Among these resins, a poly-3-hydroxybutyrate-based resin (hereinafter, may be referred to as "P3HB-based resin", that is, the "poly-3-hydroxybutyrate-based resin" and the "P3HB-based resin" are herein regarded as being synonymous), poly-3-hydroxybutyrate, in particular, can be produced through microbiological culture with use of a bio-based raw material and exhibits excellent biodegradability even in a soil and in the sea. Therefore, the poly-3-hydroxybutyrate-based resin is promising as a key material for solving the foregoing problems. However, the P3HB-based resin is slow in crystallization speed and is difficult to re-melt once crystallized. In addition, since the P3HB-based resin has a high melting point, there is a problem that it is difficult to produce containers and bottles by injection blow molding.

Methods for solving the above-described problems have been reported, including a method for producing a P3HB-based resin through injection molding (Patent Literature 1), a method for producing a biodegradable container through an injection blow molding method (Patent Literature 2), a method for producing a hollow molded product through injection blow molding using, as a molding material, a polyester resin made of polyethylene terephthalate and polyethylene naphthalate (Patent Literature 3).

CITATION LIST

Patent Literature

[Patent Literature 1]
International Publication No. WO 94/28061
[Patent Literature 2]
Japanese Patent Application Publication Tokukai No. 2000-6230
[Patent Literature 3]
Japanese Patent Application Publication Tokukaihei No. 9-52277

SUMMARY OF INVENTION

Technical Problem

However, the above-described Patent Literatures do not disclose any specific methods for injection blow molding with use of the P3HB-based resin. That is, none of the above-described Patent Literatures disclose production of a molded product containing the P3HB-based resin through the injection blow molding method.

An aspect of the present invention has been achieved in light of the foregoing problems. It is an object of the aspect of the present invention to provide: a novel production method that makes it possible to obtain, through an injection blow molding method, a molded product containing a P3HB-based resin (in particular, a molded product with an excellent appearance which contains a P3HB-based resin); and a technique for using such a method.

Solution to Problem

The inventors of the present invention conducted a diligent study for solving the foregoing problems and made the following novel finding: in the injection blow molding method, adjusting, for example, a thickness of a preform obtained through injection molding and a surface temperature of the preform before blow molding makes it possible to produce a molded product with an excellent appearance which contains the P3HB-based resin. As a result, the inventors of the present invention have completed the present invention.

Therefore, an aspect of the present invention is a method for producing a molded product containing a P3HB-based resin, the method including the steps of: (A) plasticizing a resin composition containing a P3HB-based resin; (B) subjecting the plasticized resin composition obtained in the step (A) to injection molding to obtain a preform; and (C) subjecting the preform obtained in the step (B) to blow molding to obtain a molded product, the preform having a thickness of not less than 2.5 mm and not more than 10 mm, a surface temperature of the preform to be subjected to blow molding in the step (C) being not lower than 110° C. and not higher than 165° C. (hereinafter, referred to as "present production method").

In addition, another aspect of the present invention is a molded product produced through a method including the steps of: (A) plasticizing a resin composition containing a P3HB-based resin; (B) subjecting the plasticized resin composition obtained in the step (A) to injection molding to obtain a preform; and (C) subjecting the preform obtained in the step (B) to blow molding to obtain a molded product, the preform having a thickness of not less than 2.5 mm and not more than 10 mm, a surface temperature of the preform to be subjected to blow molding in the step (C) being not lower than 110° C. and not higher than 165° C., the molded product being marine degradable (hereinafter, referred to as "present molded product").

Advantageous Effects of Invention

According to an aspect of the present invention, a novel production method with use of an injection blow molding method advantageously makes it possible to obtain a molded product with an excellent appearance which contains a P3HB-based resin.

DESCRIPTION OF EMBODIMENTS

An embodiment of the present invention will be described in detail. Note that any numerical range expressed as "A to B" in the present specification means "not less than A and not more than B" unless otherwise stated. All literatures listed in the present specification are incorporated herein by reference.

1. Outline of the Present Invention

Polyethylene terephthalate, polypropylene, and the like, which are typical resins used for containers and bottles, can be subjected to blow molding even at temperatures around the melting points thereof or at temperatures equal to or lower than the melting points thereof. In contrast, the P3HB-based resin has poor stretchability at temperatures of not higher than the melting point thereof and has a lower viscosity at temperatures of not lower than the melting point thereof. Therefore, it has been difficult to subject the P3HB-based resin to blow molding. These properties significantly differ from those of a typical polyester resin, such as polyethylene terephthalate disclosed in Patent Literature 3 described above and have made it technically difficult to mold the P3HB-based resin.

In order to solve such a problem, the inventors of the present invention conducted a diligent study concerning a method for producing a molded product containing the P3HB-based resin through the injection blow molding method. The inventors of the present invention took advantage of the slow crystallization of the P3HB-based resin and made the following finding: a preform is taken out from an injection molding mold in a state where a surface of the preform has been solidified but an interior thereof is still so hot as not to have been solidified, and then is subjected to blow molding at a temperature lower than the melting point of the P3HB-based resin, so that it is possible to produce a molded product containing the P3HB-based resin. Further, the inventors of the present invention made the following finding: such a state of the preform (that is, the state where the surface of the preform has been solidified, but the interior thereof has not been solidified) is controlled in accordance with, for example, a thickness of the preform obtained through injection molding and a surface temperature of the preform before blow molding. Furthermore, the inventors of the present invention made the following finding: in a case where the surface temperature of the preform before blow molding has not reached a specific temperature, the preform is re-heated, so that it is possible to produce a molded product containing the P3HB-based resin.

Regarding the molding of the P3HB-based resin, conventional techniques have mainly studied, for example, a composition of the raw material resin and conditions for injection blow molding. The inventors of the present invention focused on properties of the P3HB-based resin and utilized the properties thereof. As a result, the inventors of the present invention successfully produced a molded product containing the P3HB-based resin. A technique based on such a viewpoint has not been achieved and is surprising.

Thus, the present invention makes it possible to easily process a P3HB-based resin, which has a high melting point and is relatively difficult to process. The following will describe a configuration of the present production method in detail.

[2. Method for Producing Molded Product Containing P3HB-Based Resin]

The present production method is a method including, as essential steps, the following steps (A) to (C).

Step (A): a step of plasticizing a resin composition containing a P3HB-based resin Step (B): a step of subjecting, to injection molding, the plasticized resin composition obtained in the step (A) to obtain a preform Step (C): a step of subjecting, to blow molding, the preform obtained in the step (B) to obtain a molded product.

(Step (A))

In the step (A) in the present production method, a resin composition containing a P3HB-based resin (hereinafter, may be simply referred to as "resin composition") is plasticized. The step (A) can be restated as a step of melting a resin composition containing a P3HB-based resin. The step (A) can liquefy the resin composition, and thus, in the step (B), a preform having a desired shape can be obtained.

<P3HB-Based Resin>

In the present specification, a "P3HB-based resin" is an aliphatic polyester resin which contains 3-hydroxybutyrate as a repeating unit and can be produced from a microorganism.

In an embodiment of the present invention, the P3HB-based resin can be poly(3-hydroxybutyrate) in which 3-hydroxybutyrate is the only repeating unit or can be a copolymer of 3-hydroxybutyrate and another hydroxyalkanoate.

In an embodiment of the present invention, the P3HB-based resin can be a mixture of a homopolymer and one or more types of copolymers or can be a mixture of two or more types of copolymer. The form of copolymerization is not particularly limited, and can be random copolymerization, alternating copolymerization, block copolymerization, graft copolymerization, or the like.

In an embodiment of the present invention, examples of the P3HB-based resin include poly(3-hydroxybutyrate) (P3HB), poly(3-hydroxybutyrate-co-3-hydroxyhexanoate) (P3HB3HH), poly(3-hydroxybutyrate-co-3-hydroxyvalerate) (P3HB3HV), poly(3-hydroxybutyrate-co-4-hydroxybutyrate) (P3HB4HB), poly(3-hydroxybutyrate-co-3-hydroxyoctanoate) (P3HB3HO), poly(3-hydroxybutyrate-co-3-hydroxyoctadecanoate) (P3HB3HOD), poly(3-hydroxybutyrate-co-3-hydroxydecanoate) (P3HB3HD), and poly(3-hydroxybutyrate-co-3-hydroxyvalerate-co-3-hydroxyhexanoate) (P3HB3HV3HH). Among these examples, P3HB, P3HB3HH, P3HB3HV, and P3HB4HB are preferable for being easily produced on an industrial scale.

In an embodiment of the present invention, the P3HB-based resin may be selected from the group consisting of poly-3-hydroxybutyrate, poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), poly(3-hydroxybutyrate-co-4-hydroxybutyrate) and any combination thereof.

Further, P3HB3HH, which is a copolymer of 3-hydroxybutyric acid and 3-hydroxyhexanoic acid, is more preferable from the following viewpoints: (i) by changing a composition ratio of repeating units, it is possible to cause a change in melting point and crystallinity and consequently in physical properties, such as Young's modulus and heat resistance, of P3HB3HH and to enable P3HB3HH to have physical properties between the physical properties of polypropylene and the physical properties of polyethylene; and (ii) P3HB3HH is a resin that is easily produced on an industrial scale as described above and has useful physical properties. In particular, among P3HB-based resins having the characteristic of easily undergoing pyrolysis under heat of not lower than 180° C., P3HB3HH is preferable from the viewpoint of having a low melting point and enabling molding at low temperatures.

The P3HB-based resin can be produced, for example, by a microorganism. The microorganism that produces the P3HB-based resin is not limited to a particular one, provided that the microorganism is capable of producing the P3HB-based resin. For example, the first P3HB-producing bacteria discovered was *Bacillus megaterium* (discovered in 1925), and other examples of a P3HB-producing bacteria include natural microorganisms such as *Cupriavidus necator* (previously classified as *Alcaligenes eutrophus*), *Ralstonia eutropha*, and *Alcaligenes latus*. These microorganisms are known to accumulate P3HB within bacterial cells of the microorganisms.

Known bacteria that produce a copolymer of hydroxybutyrate and another hydroxyalkanoate include *Aeromonas caviae*, which is a bacterium capable of producing P3HB3HV and P3HB3HH, and *Alcaligenes eutrophus*, which is a bacterium capable of producing P3HB4HB. Particularly with respect to P3HB3HH, *Alcaligenes eutrophus* AC32, FERM P-6038 (T. Fukui, Y. Doi, J. Bacteriol., 179, p. 4821-4830 (1997)), into which genes of P3HA synthetases have been introduced in order to increase P3HB3HH productivity, is more preferable. Bacterial cells of these microorganisms which have been cultured under appropriate conditions to accumulate P3HB3HH in the bacterial cells are used. Apart from the above, depending on the P3HB-based resins to be produced, genetically modified microorganisms into which various genes associated with synthesis of the P3HB-based resins have been introduced can be used, and culture conditions including substrate type can be optimized.

P3HB3HH can also be produced by, for example, a method disclosed in International Publication No. WO 2010/013483. Examples of commercially available P3HB3HH include “KANEKA Biodegradable Polymer PHBH (Registered trademark)” (for example, X131A used in Examples) by KANEKA CORPORATION.

In an embodiment of the present invention, a composition ratio of repeating units in P3HB3HH is such that a composition ratio of a 3-hydroxybutyrate unit to a 3-hydroxyhexanoate unit is preferably 80/20 (mol/mol) to 99/1 (mol/mol) and more preferably 75/15 (mol/mol) to 97/3 (mol/mol) from the viewpoint of a balance between plasticity and strength. When the composition ratio of a 3-hydroxybutyrate unit to a 3-hydroxyhexanoate unit is not less than 80/20 (mol/mol) and not more than 99/1 (mol/mol), moldability is improved.

In an embodiment of the present invention, a weight average molecular weight (may hereinafter be referred to as “Mw”) of the P3HB-based resin is not particularly limited, but is preferably 150,000 to 800,000, more preferably 200,000 to 700,000, and even more preferably 250,000 to 600,000. In a case where the weight average molecular weight is not less than 150,000, sufficient mechanical properties are obtained. In a case where the weight average molecular weight is not more than 800,000, sufficient crystallization speed is obtained and good molding processability is achieved. The weight average molecular weight of the P3HB-based resin can be determined as a molecular weight in terms of polystyrene as measured by gel permeation chromatography (GPC) (“Shodex GPC-101” manufactured by Showa Denko K.K.) in which a polystyrene gel (“Shodex K-804” manufactured by Showa Denko K.K.) is used in a column and chloroform is used as a mobile phase.

<Resin Composition>

The resin composition in the step (A) may contain only the P3HB-based resin or may contain another resin in addition to the P3HB-based resin. Such another resin is, although not particularly limited, preferably a biodegradable aliphatic polyester-based resin other than the P3HB-based resin. Examples of such a biodegradable aliphatic polyester-based resin include a polybutylene succinate (PBS)-based resin, a polycaprolactone (PCL)-based resin, and a polyhydroxyalkanoate-based resin (other than the P3HB-based resin). Examples of the polybutylene succinate (PBS)-based resin include polybutylene succinate (PBS) and polybutylene succinate adipate (PBSA). The polyhydroxyalkanoate-based resin other than the P3HB-based resin means a polyhydroxyalkanoate-based resin which does not contain 3-hydroxybutyrate as a monomer component. Examples of such a polyhydroxyalkanoate-based resin include polyglycolic acid, polylactic acid, and a poly-4-hydroxybutyrate-based resin. The poly-4-hydroxybutyrate-based resin may be poly(4-hydroxybutyrate) containing only 4-hydroxybutyrate as a repeating unit or may be a copolymer of 4-hydroxybutyrate and another hydroxyalkanoate. Among these, a PBSA-based resin is preferable from the viewpoint of balance between drop resistance, molding processability, and biodegradability.

The PBSA-based resin is an aliphatic polyester polymer containing 1,4-butanediol, succinic acid, and adipic acid as structural units. In an embodiment of the present invention, the PBSA-based resin may contain, as structural units, any diol, dicarboxylic acid, or hydroxyalkanoate other than the 1,4-butanediol, the succinic acid, and the adipic acid, provided that the biodegradability is not impaired. Examples of such a PBSA-based resin include polybutylene succinate adipate, a copolymer of polybutylene succinate adipate and lactic acid, a copolymer of polybutylene succinate adipate and terephthalic acid, a copolymer of polybutylene succinate adipate and malic acid, a copolymer of polybutylene succinate adipate and sebacic acid, and a copolymer of polybutylene succinate adipate and azelaic acid.

Among the above PBSA-based resins, the resin composition in the step (A) is preferably the polybutylene succinate adipate from the viewpoint of industrial availability. In addition, the resin composition containing the polybutylene succinate adipate makes it possible to achieve high biodegradability and high dropping resistance in a well-balanced manner.

In an embodiment of the present invention, the PBSA-based resin may contain, for example, a diol which is not described above and a dicarboxylic acid which is not described above, provided that an effect of the present invention is not impaired. Examples of such a diol include ethylene glycol, 1,3-propanediol, 1,2-propanediol, 1,4-butanediol, 1,5-pentanediol, 1,6-hexanediol, 1,4-cyclohexanediol, and 1,4-cyclohexanedimethanol. Examples of such a dicarboxylic acid include suberic acid, sebacic acid, dodecanoic acid, succinic anhydride, and adipic anhydride.

In an embodiment of the present invention, a PBSA-based resin content in the resin composition is not particularly limited but is, for example, not more than 49% by weight, preferably not more than 45% by weight, and more preferably not more than 40% by weight, relative to a weight of the resin composition. The PBSA-based resin content in the resin composition has a lower limit which is not particularly limited and may be 0% by weight. The resin composition having the PBSA-based resin content of not more than 50% by weight keeps moderate marine degradability.

In an embodiment of the present invention, the PBSA-based resin can be a commercially available one. Examples of such a PBSA-based resin include BioPBS (Registered Trademark), FD92PM, FD92PB, FD72PM, and FD72PB manufactured by PTT MCC Biochem, and Bionolle (Registered Trademark) and SMB (a PHBH resin mixture containing 50% by weight of PBSA) manufactured by Showa Denko K.K.

In an embodiment of the present invention, a P3HB-based resin content in the resin composition is not particularly limited but is, for example, not less than 51% by weight, preferably not less than 55% by weight, and more preferably not less than 60% by weight, relative to the weight of the resin composition. The P3HB-based resin content in the resin composition has an upper limit which is not particularly limited and may be 100% by weight.

The resin in the resin composition in the step (A) has a form which is not particularly limited. Examples of the form of the resin include a powder form, a pellet form, a piece form, and a flake form. The resin of the resin composition preferably has a pellet form from the viewpoint of efficient production.

In addition, the resin composition in the step (A) may contain other components which are not described above. For example, the resin composition may contain an organic or inorganic filler and the like, provided that an effect of the present invention is not impaired. As examples of the organic filler, for example, wood-based materials, such as woodchips, wood powder, cellulose powder, nanocellulose, and sawdust or naturally-occurring materials, such as rice chuffs, rice flour, starch, corn starch, rice straw, wheat straw, and natural rubber are preferable from the viewpoint of the biodegradability of a resultant molded product and carbon-neutrality. Examples of the inorganic filler include talc, kaolin, calcium carbonate, bentonite, mica, sericite, glass flakes, graphite, magnesium hydroxide, aluminum hydroxide, antimony trioxide, barium sulphate, zinc borate, hydrated calcium borate, alumina, magnesia, wollastonite, xonotlite, sepiolite, whiskers, glass fibers, glass flakes, metal powder, beads, silica balloons, shirasu balloons, and organic balloons. An amount of the organic or inorganic filler contained can be determined as appropriate and is not particularly limited. The organic or inorganic filler can be used alone. Alternatively, the two or more organic or inorganic fillers can be used in combination.

The resin composition may contain one or more typical additives including: coloring agents such as pigments and colorants; deodorizing agents such as activated carbon and zeolite; perfumes such as vanillin and dextrin; antioxidant agents; antioxidative agents; weather resistance improving agents; ultraviolet ray absorbing agents; water repellent agents; antibacterial agents; slidability improving agents; and other secondary additives, as well as the above-described organic or inorganic filler, provided that an effect of the present invention is not impaired. An amount of the additive contained can also be determined as appropriate.

<Plasticization>

A method for plasticization is not particularly limited, but plasticization may be performed with use of, for example, an electric injection molding machine or a hydraulic injection molding machine.

A heating temperature during the plasticization is particularly not limited, provided that, at the heating temperature, the above resin composition can be completely melted and does not undergo pyrolysis. Such a heating temperature is, for example, 120° C. to 180° C., preferably 130° C. to 175° C., and more preferably 140° C. to 170° C. A period of time for the heating is also not particularly limited but is, for example, 10 seconds to 5 minutes. In an embodiment of the present invention, the plasticization is performed through a method described in Examples which will be described later.

(Step (B))

In the step (B) of the present production method, the plasticized resin composition obtained in the step (A) is subjected to injection molding to obtain a preform. Specifically, the resin composition plasticized in the step (A) is charged into a barrel. The resin composition is melted and mixed with use of a cylinder and then is injected into a mold for a preform. The resin composition is cooled to prepare a preform.

In the present specification, the "preform" means an object which is obtained by subjecting, to injection molding, a resin plasticized by the application of heat and which has any shape. The preform can be restated as an intermediate obtained during a production process in the present production method.

In the step (B), it is preferable that an interior of the preform is not cooled to be solidified. That is, it is preferable that the preform is subjected to blow molding in the step (C) in a state where the interior of the preform has not been cooled to be solidified. The blow molding in the step (C) is performed with use of the preform whose surface has been solidified and whose interior has not been solidified, so that a molded product with an excellent appearance can be obtained. A method for confirming the state where the interior of the preform has not been cooled to be solidified is not particularly limited. Such confirmation can be performed, for example, by cutting the preform taken out and observing the cross-section thereof or by rapidly cooling the preform taken out to a temperature not higher than the glass transition temperature to cause the crystallization to freeze and measuring crystallinity and the like of the surface of the preform and the interior thereof.

In an embodiment of the present invention, the step (B) can be restated as a step of subjecting, to injection molding, the plasticized resin composition obtained in the step (A) to obtain a preform whose surface has been solidified and whose interior has not been solidified.

In the step (B), a method for the injection molding is not particularly limited but may be, for example, a method with use of an injection molding machine. Examples of the injection molding machine include an electric injection molding machine and a hydraulic injection molding machine. An electric injection molding machine having an injection blow molding function is preferably used from the viewpoint of having excellent accuracy of injection and achieving a molded product with an excellent appearance.

Conditions for the injection molding are not particularly limited, provided that a desired preform can be obtained. For example, in a case where an electric injection molding machine is used, a barrel temperature is, for example, as follows: 140° C. to 180° C. at a nozzle; 130° C. to 170° C. at a front portion; 120° C. to 160° C. at a middle portion; and 110° C. to 150° C. at a rear portion.

In a case where a plurality of preforms are produced by performing injection molding once, a hot runner system is typically employed in order to improve productivity. The hot runner is disposed inside a hot runner block which is a part of the mold for a preform. A temperature of the hot runner may be set at, for example, 140° C. to 180° C.

The rate at which the above resin composition is injected from a nozzle into the mold may be, for example, 5% to 60% or 5 mm/s to 50 mm/s. Further, in the mold, a holding pressure may be, for example, 5 MPa to 150 MPa, and a pressure holding time may be, for example, 0 seconds to 30 seconds.

In an embodiment of the present invention, conditions for the injection molding may be conditions described in Examples which will be described later.

A shape of the above preform can be determined depending on the mold used for the injection molding. In order to make blow molding described later easier, the preform is formed preferably so as to have a hollow and more preferably so as to have a cylindrical shape having a hollow.

The above preform has a thickness of not less than 2.5 mm, preferably not less than 3 mm, more preferably not less than 3.5 mm, and still more preferably not less than 4 mm. When a preform has a thickness of not less than 2.5 mm, the interior of the preform is less likely to decrease in temperature and thus is less likely to be cooled to be solidified. Further, the thickness of the above preform is, for example, not more than 10 mm, preferably not more than 8 mm, and more preferably not more than 6 mm. When a preform has a thickness of not more than 10 mm, the preform is more easily processed during the blow molding. In an embodiment of the present invention, the thickness of the preform is not less than 2.5 mm and not more than 10 mm, preferably not less than 3 mm and not more than 8 mm, more preferably not less than 3.5 mm and not more than 6 mm, and still more preferably not less than 4 mm and not more than 6 mm.

A temperature of the mold for a preform is not particularly limited, provided that, at the temperature, the above resin composition is not completely solidified. The temperature of the mold for a preform may be, for example, 50° C. to 100° C. The temperature of the mold falling within 35° C. to 60° C. may improve productivity and may make it easier to obtain a molded product with fewer burrs.

The resin composition injected from a nozzle is cooled in a mold for a preform. At this time, the preform is cooled to the extent that an interior of the preform is not completely solidified, and only the surface of the preform is solidified. Specifically, a surface temperature of the above preform is not lower than 110° C., preferably not lower than 115° C., and more preferably not lower than 120° C. In addition, the surface temperature of the above preform has an upper limit of not higher than 165° C., preferably not higher than 160° C., and more preferably not higher than 155° C. The temperature falling within the above-described ranges makes it unlikely that the molded product breaks during the blow molding in the step (C). In an embodiment of the present invention, the surface temperature of the preform is not lower than 110° C. and not higher than 165° C., preferably not lower than 115° C. and not higher than 160° C., and more preferably not lower than 120° C. and not higher than 155° C. The surface temperature of the preform can be measured through, for example, laser. The surface temperature of the preform is preferably maintained within the above-described ranges until the step (C) described later starts. The cooling time is not particularly limited, provided that the surface temperature of the preform falls within the above-described ranges, but the cooling time may be, for example, 5 seconds to 30 seconds.

(Step (C))

In the step (C) of the present production method, the preform obtained in the step (B) is subjected to blow molding to obtain a molded product. Specifically, after the preform obtained in the step (B) is transferred to a blow molding mold having a desired shape and then is inflated with use of compressed air to be brought into close contact with an inside of the above mold, the preform inflated is cooled, so that the molded product is obtained.

In the present specification, the "molded product" means an article which is obtained by blow molding the above preform and which has any shape. The molded product can be restated as a finished product obtained through the present production method.

A surface temperature of the preform to be subjected to blow molding in the step (C) is not lower than 110° C., preferably not lower than 115° C., and more preferably not lower than 120° C. In addition, the surface temperature of the above preform has an upper limit of not higher than 165° C., preferably not higher than 160° C., more preferably not higher than 155° C., still more preferably not higher than 150° C., and particularly preferably not higher than 140° C. The surface temperature of the preform falling within the above-described ranges makes it unlikely that the molded product breaks during the blow molding in the step (C). In an embodiment of the present invention, the surface temperature of the preform is not lower than 110° C. and not higher than 165° C., preferably not lower than 115° C. and not higher than 160° C., and more preferably not lower than 120° C. and not higher than 155° C. Note that the "surface temperature of the preform to be subjected to blow molding" in the step (C) can be restated as a "surface temperature of a preform (immediately) before blow molding".

In the step (C), a method for the blow molding is not particularly limited but may be, for example, a method with use of an injection blow molding machine.

Conditions for the blow molding are not particularly limited, provided that a desired molded product can be obtained. For example, in a case where an injection blow molding machine is used, a temperature of a blow molding mold may be, for example, 20° C. to 80° C., and an air pressure of the compressed air may be, for example, 0.3 MPa to 10 MPa. In an embodiment of the present invention, conditions for the blow molding may be conditions described in Examples which will be described later.

(Step (B'))

In an embodiment of the present invention, the present production method may further include, between the step (B) and the step (C), a step of heating the preform (hereinafter may be referred to as "step (B')"). The step (B') can be restated as a step of re-heating the preform.

The step (B') is performed, for example, when the preform obtained in the step (B) has a surface temperature of lower than 110° C. That is, in the present production method, the step (B') is performed so that the preform to be subjected to blow molding in the step (C) has a surface temperature of not lower than 110° C.

Including the step (B') makes it possible to obtain a molded product with an excellent appearance even in a case where the preform obtained in the step (B) has a low surface temperature (for example, lower than 110° C.).

In the step (B'), a method for the re-heating is not particularly limited. As the method for the re-heating, any method, such as a heater, infrared light, and an ultrasonic wave can be employed. From the viewpoint of simplicity, a heating pot including a heater is preferably used. The re-heating can be indirectly performed with use of a heater or can be performed directly performed through contact with a heater. It is preferable that the preform obtained in the step (B) is taken out from the injection molding machine and then is re-heated by being indirectly heated with use of a heating pot including a heater.

Conditions for the re-heating are not particularly limited, provided that, under the conditions, the preform to be subjected to blow molding in the step (C) has a surface temperature of not lower than 110° C. For example, in a case where the heating is performed in a heating pot, for example, a surface temperature of a non-contact heating core of the heating pot may be 150° C. to 300° C., a surface temperature of the heating pot may be 150° C. to 300° C., and a re-heating time may be 0 seconds to 40 seconds. In an embodiment of the present invention, conditions for the re-heating may be conditions described in Examples which will be described later.

[3. Molded Product]

The present molded product is produced through the present production method. In an embodiment of the present invention, the present molded product is produced through a method including the steps of: (A) plasticizing a resin composition containing a P3HB-based resin; (B) subjecting, to injection molding, the plasticized resin composition obtained in the step (A) to obtain a preform; and (C) subjecting, to blow molding, the preform obtained in the step (B) to obtain a molded product, the preform having a thickness of not less than 2.5 mm and not more than 10 mm, a surface temperature of the preform to be subjected to blow molding in the step (C) being not lower than 110° C. and not higher than 165° C., and the molded product is marine degradable.

As described above, the present production method includes a step (step (C)) of subjecting a preform to blow molding. Thus, in an embodiment of the present invention, the present molded product is preferably hollow inside.

The present molded product is not particularly limited, provided the present molded product is produced through the present production method. Examples of such a molded product include a tube, a container (for example, a bottle container), a bag, a component, a pipe, a tank, and a case for a musical instrument, an industrial tool or the like.

The present molded product has a shape which is not particularly limited but, for example, may have a wide mouth or may have a flat shape, a spherical shape, or a complex shape.

The present molded product has a diameter, a length, and a capacity which are not particularly limited and can be designed as appropriate depending on, for example, a usage of the present molded product.

In the present production method, as described above, used is a resin composition containing a P3HB-based resin which is biodegradable and/or marine degradable. Thus, in an embodiment of the present invention, the present molded product is preferably marine degradable.

The present invention is not limited to the embodiments, but can be altered by a skilled person in the art within the scope of the claims. The present invention also encompasses, in its technical scope, any embodiment derived by combining technical means disclosed in differing embodiments.

In other words, an embodiment of the present invention is as follows.

<1> A method for producing a molded product containing a P3HB-based resin, the method including the steps of:
(A) plasticizing a resin composition containing a P3HB-based resin;
(B) subjecting the plasticized resin composition obtained in the step (A) to injection molding to obtain a preform; and
(C) subjecting the preform obtained in the step (B) to blow molding to obtain a molded product,
the preform having a thickness of not less than 2.5 mm and not more than 10 mm,
a surface temperature of the preform to be subjected to blow molding in the step (C) being not lower than 110° C. and not higher than 165° C.

<2> The method according to <1>, wherein the preform is to be subjected to blow molding in the step (C) in a state where an interior of the preform is not cooled to be solidified.

<3> The method according to <1> or <2>, further including, between the step (B) and the step (C), a step of heating the preform.

<4> The method according to any one of <1> to <3>, wherein the P3HB-based resin is selected from the group consisting of poly-3-hydroxybutyrate, poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), poly(3-hydroxybutyrate-co-4-hydroxybutyrate), and any combination thereof.

<5> The method according to any one of <1> to <4>, wherein the P3HB-based resin is poly(3-hydroxybutyrate-co-3-hydroxyhexanoate).

<6> The method according to any one of <1> to <5>, wherein the resin composition further contains polybutylene succinate adipate.

<7> A molded product produced through the method according to any one of <1> to <6>.

<8> The molded product according to <7>, the molded product being marine degradable.

<9> A molded product produced through a method including the steps of:
(A) plasticizing a resin composition containing a P3HB-based resin;
(B) subjecting the plasticized resin composition obtained in the step (A) to injection molding to obtain a preform; and
(C) subjecting the preform obtained in the step (B) to blow molding to obtain a molded product,
the preform having a thickness of not less than 2.5 mm and not more than 10 mm,
a surface temperature of the preform to be subjected to blow molding in the step (C) being not lower than 110° C. and not higher than 165° C.,
the molded product being marine degradable.

EXAMPLES

The following description will discuss embodiments of the present invention in further detail on the basis of Examples. However, the present invention is not limited by the Examples.

[Measuring Method and Evaluating Method]

In Examples and Comparative Examples, measurement and evaluation were performed through the following method.

(Injection Blow Moldability)

With use of an injection blow molding machine, ASB12N/10T (manufactured by Nissei ASB Machine Co., Ltd.), evaluated was a shape (appearance) of a molded product obtained by blow molding a preform so as to have a container shape. The evaluation was carried out as follows: a container with a good appearance was evaluated as "GOOD"; a container with a hole that had been made during blow molding was evaluated as "POOR B"; a container which, due to a drawdown, failed to go ahead to the blowing step was evaluated as "POOR C"; and a container which had torn off or had an uneven thickness was evaluated as "POOR D".

(Drop Test)

The containers produced in Examples and Comparative Examples were dropped from 1.7 m above. Evaluation was carried out as follows: a container which broke was evaluated as "POOR", and a container which did not break was evaluated as "GOOD".

Example 1

Pellets of KANEKA Biodegradable Polymer PHBH (Registered trademark) X131 (manufactured by KANEKA CORPORATION) were put into an injection blow molding machine ASB12N/10T (manufactured by Nissei ASB Machine Co., Ltd.), and then the resin was plasticized.

The plasticized resin thus obtained was subsequently subjected to injection molding to obtain a preform. A barrel temperature during the injection molding was as follows: 165° C. at a nozzle; 155° C. at a front portion; 145° C. at a middle portion; and 135° C. at a rear portion. Further, an injection rate was 40%, a holding pressure was 4 MPa, and a pressure holding time was 13 seconds. Furthermore, a hot runner temperature was 165° C. at all of a block, a spool, and a nozzle. As a mold for a preform, a mold A was used. In the mold, a temperature on a core side and a temperature on a cavity side were each 90° C., and a cooling time was 10 seconds. The preform had a thickness of 4.5 mm, and a molded product obtained through blowing had a capacity of 320 mL.

After that, the preform thus obtained was re-heated. The re-heating was performed for 25 seconds at a surface temperature of a non-contact heating core of 275° C. and a surface temperature of a heating pot of 180° C. The preform before the re-heating had a surface temperature of 109° C.

Subsequently, blow molding was performed with use of the preform which had been re-heated and which had a surface temperature of 124° C., so that a container (molded product) was obtained. During the blow molding, a temperature of the mold was 35° C., and an air pressure was 0.4 MPa.

Example 2

Used as a resin was a mixture of X131N and SMB (a PHBH resin mixture containing 50% by weight of PBSA and 50% by weight of X131N). The above mixture was obtained by manually crushing pellets of X131N and pellets of SMB, both of which had been put into a bag at a weight ratio of X131N:SMB=4:6 and stirring them to become uniform. The resin mixture thus obtained was plasticized under the same conditions as those in Example 1.

The resin mixture was subsequently subjected to injection molding through the same method as that in Example 1 except that the temperature on the core side of the mold and the temperature on the cavity side of the mold were each 60° C., so that a preform was obtained. The preform had a thickness of 4.5 mm, and a molded product obtained through blowing had a capacity of 320 mL.

After that, the preform thus obtained was re-heated under the same conditions as those in Example 1. The preform before the re-heating had a surface temperature of 90° C.

Subsequently, blow molding was performed with use of the preform which had been re-heated and which had a surface temperature of 119° C., so that a container was obtained. During the blow molding, a temperature of the mold was 30° C., and an air pressure was 0.4 MPa.

Example 3

With use of the same resin as that in Example 1 and under the same conditions as those in Example 1, the resin was plasticized.

The resin was subsequently subjected to injection molding through the same method as that in Example 1 except that a mold C was used as the mold for a preform, so that a preform was obtained. The preform had a thickness of 6.5 mm, and a molded product obtained through blowing had a capacity of 320 mL.

After that, the preform thus obtained was re-heated under the same conditions as those in Example 1. The preform before the re-heating had a surface temperature of 126° C.

Subsequently, blow molding was performed with use of the preform which had been re-heated and which had a surface temperature of 136° C. and under the same conditions as those in Example 1, so that a container was obtained.

Example 4

With use of the same resin as that in Example 1 and under the same conditions as those in Example 1, the resin was plasticized.

The resin was subsequently subjected to injection molding through the same method as that in Example 1 except that the mold C was used as the mold for a preform, so that a preform was obtained. The preform had a thickness of 6.5 mm, and a molded product obtained through blowing had a capacity of 320 mL.

The preform was not re-heated, and blow molding was performed with use of the preform having a surface temperature of 126° C. and under the same conditions as those in Example 1, so that a container was obtained.

Comparative Example 1

With use of the same resin as that in Example 1 and under the same conditions as those in Example 1, the resin was plasticized.

The resin was subsequently subjected to injection molding through the same method as that in Example 1 except that a mold B was used as the mold for a preform, so that a preform was obtained. The preform had a thickness of 2 mm, and a molded product obtained through blowing had a capacity of 200 mL.

After that, the preform was not re-heated, and blow molding was performed with use of the preform having a surface temperature of 98° C. and under the same conditions as those in Example 1, so that a container was obtained.

Comparative Example 2

With use of the same resin as that in Example 1 and under the same conditions as those in Example 1, the resin was plasticized.

The resin was subsequently subjected to injection molding through the same method as that in Example 1 except that the mold B was used as the mold for a preform, so that a preform was obtained. The preform had a thickness of 2 mm, and a molded product obtained through blowing had a capacity of 200 mL.

After that, the preform thus obtained was re-heated under the same conditions as those in Example 1. The preform before the re-heating had a surface temperature of 98° C.

Subsequently, blow molding was performed with use of the preform which had been re-heated and which had a surface temperature of 108° C. and under the same conditions as those in Example 1, so that a container was obtained.

Comparative Example 3

With use of the same resin as that in Example 1 and under the same conditions as those in Example 1, the resin was plasticized.

The resin was subsequently subjected to injection molding through the same method as that in Example 1 except that the mold B was used as the mold for a preform, so that a preform was obtained. The preform had a thickness of 2 mm, and a molded product obtained through blowing had a capacity of 200 mL.

After that, the preform thus obtained was re-heated under the same conditions as those in Example 1 except that the surface temperature of the non-contact heating core was 295° C., and a surface temperature of the heating pot was 200° C. The preform before the re-heating had a surface temperature of 98° C.

Subsequently, blow molding was performed with use of the preform which had been re-heated and which had a surface temperature of 123° C. and under the same conditions as those in Example 1, so that a container was obtained.

Comparative Example 4

With use of the same resin as that in Example 1 and under the same conditions as those in Example 1, the resin was plasticized.

After that, the preform thus obtained was re-heated under the same conditions as those in Example 1 except that the surface temperature of the non-contact heating core was 400° C., a surface temperature of the heating pot was 400° C. The preform before the re-heating had a surface temperature of 109° C.

Although blow molding was subsequently attempted to be performed with use of the preform which had been re-heated and which had a surface temperature of 167° C. and under the same conditions as those in Example 1, a drawdown occurred. Thus, a container (molded product) failed to be obtained.

[Result]

Table 1 shows results of evaluation for injection blow moldability with respect to Examples 1 to 4 above and Comparative Examples 1 to 5 above and results of drop tests with respect to Examples 1 to 4. In Table 1, the "PF" denotes a "preform". Further, the "PF temperature" denotes a surface temperature of a preform to be subjected to each step (in other words, a surface temperature of a preform before each step). Note that, in Comparative Examples 1 to 5, no containers with excellent appearances were obtained, and thus a drop test did not be performed.

TABLE 1

| Steps | Items | Ex. (Example) 1 | Ex. 2 | Ex. 3 | Ex. 4 | Comp. (Comparable) Ex. 1 | Comp. Ex. 2 | Comp. Ex. 3 | Comp. Ex. 4 | Comp. Ex. 5 |
|---|---|---|---|---|---|---|---|---|---|---|
| Mixing ratio | X131N | 100 | 40 | 100 | 100 | 100 | 100 | 100 | 100 | 100 |
| | SMB | — | 60 | — | — | — | — | — | — | — |
| Injection molding | PF thickness (mm) | 4.5 | 4.5 | 6.5 | 6.5 | 2 | 2 | 2 | 4.5 | 4.5 |
| Re-heating | PF temperature (° C.) | 109 | 90 | 126 | 126 | 98 | 98 | 98 | 109 | 109 |
| | Non-contact heating core surface temperature (° C.) | 275 | 275 | 275 | — | — | 275 | 295 | — | 400 |
| | Heating pot surface temperature (° C.) | 180 | 180 | 180 | — | — | 180 | 200 | — | 400 |
| | Re-heating time (° C.) | 25 | 25 | 25 | — | — | 25 | 23 | — | 25 |
| Blow molding | PF temperature (° C.) | 124 | 119 | 136 | 123 | 98 | 108 | 123 | 109 | 167 |
| Injection blow moldability | | GOOD | GOOD | GOOD | GOOD | POOR B | POOR B | POOR D | POOR B | POOR C |
| Drop test | | POOR | GOOD | POOR | POOR | — | — | — | — | — |

The resin was subsequently subjected to injection molding through the same method as that in Example 1, so that a preform was obtained. The preform had a thickness of 4.5 mm, and a molded product obtained through blowing had a capacity of 320 mL.

After that, the preform was not re-heated, and blow molding was performed with use of the preform having a surface temperature of 109° C. and under the same conditions as those in Example 1, so that a container was obtained.

Comparative Example 5

With use of the same resin as that in Example 1 and under the same conditions as those in Example 1, the resin was plasticized.

The resin was subsequently subjected to injection molding through the same method as that in Example 1 except that the mold A was used as the mold for a preform, so that a preform was obtained. The preform had a thickness of 4.5 mm, and a molded product obtained through blowing had a capacity of 320 mL.

Table 1 shows that Examples 1 to 4 exhibited good injection blow moldability. In addition, Example 2 in which a specific resin mixture was used exhibited good impact resistance as well as good injection blow moldability. Example 4 in which the re-heating was not performed also exhibited good injection blow moldability. In contrast, in Comparative Examples 1 and 2 in which each preform had a thickness of 2 mm, and each preform before blow molding had a surface temperature of lower than 110° C., each container had a hole which had been made during blow molding. Further, even if the preforms before blow molding had temperatures of not lower than 110° C., the preforms having thicknesses of 2 mm resulted in containers with uneven thicknesses. Furthermore, even if the preforms had thicknesses of 4.5 mm, the preforms before blow molding having temperatures of lower than 110° C. resulted in containers with holes. In addition, if the preform had a surface temperature of higher than 165° C., a container failed to be molded due to a drawdown of a resin.

Therefore, it was found that if a preform had a thickness of more than 2 mm and the preform before blow molding had a surface temperature of not lower than 110° C. and not higher than 165° C., it was possible to produce a container with a good appearance. In addition, it was found that using a specific resin mixture made it possible to produce a container with excellent impact resistance as well as the good appearance.

INDUSTRIAL APPLICABILITY

The present production method makes it possible to produce a biodegradable molded product with an excellent appearance and thus can be suitably used for producing various molded products (particularly, containers).

The invention claimed is:

1. A method for producing a molded product, the method comprising:

plasticizing a resin composition comprising a poly-3-hydroxybutyrate-based resin to obtain a plasticized resin composition, wherein a content of the poly-3-hydroxybutyrate-based resin in the resin composition is at least 51 wt %;

subjecting the plasticized resin composition to injection molding to obtain a preform having a thickness of from 2.5 mm to 10 mm, wherein a temperature of a mold for obtaining the preform is from 35° C. to 100° C.; and subjecting the preform to blow molding to obtain a molded product, wherein a surface temperature of the preform to be subjected to the blow molding is from 110° C. to 165° C.

2. The method according to claim 1, wherein the preform is to be subjected to the blow molding in a state where an interior of the preform is not cooled to be solidified.

3. The method according to claim 1, further comprising: heating the preform after the injection molding and before the blow molding.

4. The method according to claim 1, wherein the poly-3-hydroxybutyrate-based resin comprises at least one selected from the group consisting of poly-3-hydroxybutyrate, poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

5. The method according to claim 1, wherein the poly-3-hydroxybutyrate-based resin is poly(3-hydroxybutyrate-co-3-hydroxyhexanoate).

6. The method according to claim 1, wherein the resin composition further comprises polybutylene succinate adipate.

7. The method according to claim 2, further comprising: heating the preform after the injection molding and before the blow molding.

8. The method according to claim 2, wherein the poly-3-hydroxybutyrate-based resin comprises at least one selected from the group consisting of poly-3-hydroxybutyrate, poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

9. The method according to claim 3, wherein the poly-3-hydroxybutyrate-based resin comprises at least one selected from the group consisting of poly-3-hydroxybutyrate, poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

10. The method according to claim 2, wherein the poly-3-hydroxybutyrate-based resin is poly(3-hydroxybutyrate-co-3-hydroxyhexanoate).

11. The method according to claim 3, wherein the poly-3-hydroxybutyrate-based resin is poly(3-hydroxybutyrate-co-3-hydroxyhexanoate).

12. The method according to claim 1, wherein the resin composition does not comprise polylactic acid.

13. The method according to claim 1, wherein the resin composition consists of poly(3-hydroxybutyrate-co-3-hydroxyhexanoate).

* * * * *